(12) United States Patent
Millett et al.

(10) Patent No.: US 6,972,763 B1
(45) Date of Patent: Dec. 6, 2005

(54) SYSTEM AND METHOD FOR DYNAMICALLY GENERATING A TEXTUAL DESCRIPTION FOR A VISUAL DATA REPRESENTATION

(75) Inventors: Troy Millett, Lindon, UT (US); Derrick Shadel, South Jordan, UT (US); Mardell Cheney, Highland, UT (US)

(73) Assignee: Corda Technologies, Inc., Lindon, UT (US)

(*) Notice: Subject to any disclaimer, the term of this patent is extended or adjusted under 35 U.S.C. 154(b) by 0 days.

(21) Appl. No.: 10/271,972

(22) Filed: Oct. 15, 2002

Related U.S. Application Data

(60) Provisional application No. 60/365,896, filed on Mar. 20, 2002.

(51) Int. Cl.[7] .............................................. G06T 11/20
(52) U.S. Cl. ..................................................... 345/440
(58) Field of Search ................................ 345/729, 746, 345/747, 440, 707, 744, 865, 866, 978, 183 FOR, 345/929; 382/217, 218; 348/62; 715/729

(56) References Cited

U.S. PATENT DOCUMENTS

| | | | |
|---|---|---|---|
| 5,899,975 A | 5/1999 | Nielsen | ........................ 704/260 |
| 6,075,968 A | 6/2000 | Morris et al. | ................ 434/350 |
| 6,106,399 A | 8/2000 | Baker et al. | |
| 2001/0030653 A1 * | 10/2001 | Bossut et al. | ................ 345/619 |
| 2002/0158903 A1 * | 10/2002 | Janakiraman et al. | ........ 345/746 |

OTHER PUBLICATIONS

Jacquelyn Gavron and Joseph Moran, © 1996 by Macmilian Computer Publishing, How To Use Windows NT 4 Workstation, pp. 14-15, 22-29, 38-39.*

* cited by examiner

*Primary Examiner*—Matthew C. Bella
*Assistant Examiner*—G. F. Cunningham
(74) *Attorney, Agent, or Firm*—Madson & Metcalf

(57) ABSTRACT

A system and method for dynamically generating a textual description for a visual data representation is provided. The method accesses a data set and visual template associated with a visual data representation. A textual description template is also accessed. The visual template is interpreted using the textual description template and data from the data set. As the visual template is interpreted, a textual description is generated corresponding to the visual data representation. The system and method may be initiated by a user request or a command based on some other event such as the passage of time, a change to data in the data set, or the like. The textual description may be generated dynamically in response to a request or previous to, and in anticipation of, a request from a user.

35 Claims, 6 Drawing Sheets

SYSTEM AND METHOD FOR DYNAMICALLY GENERATING A TEXTUAL DESCRIPTION FOR A VISUAL DATA REPRESENTATION

RELATED APPLICATIONS

This application is a continuation-in-part of U.S. Patent Application Ser. No. 60/365,896, filed Mar. 20, 2002, for "Automatic Generation of Text Describing a Data Chart," with inventors Neal Williams, Mardell Cheney, Troy Millet, and Derrick Shadel, which is hereby incorporated by reference.

BACKGROUND

1. Field of the Invention

The present invention relates generally to the field of charts, graphs and other visual representations of data. More specifically, the present invention relates to a system and method for dynamically generating a textual description for a visual data representation.

2. Description of Related Background Art

Computers provide a valuable tool for the collection, distribution, and analysis of data describing various aspects of our world today. The data may describe measurements taken of a real object or phenomena, behavior of a theoretical formula in an imaginary system, or any variation in between.

This data may have value in and of itself. However, generally, the data becomes valuable due to the way in which it is represented within an understood frame of reference. Representations of data include raw, formatted, summarized, condensed, and the like. As a frame of reference is defined, the data in the set takes on more value and meaning. The meaning comes from identifiable relationships. The relationships may be identified within a single data set. Alternatively, relationships may be identified between a plurality of data sets.

Generally, when examining raw data it is difficult to identify relationships. Therefore, a useful tool for identifying and representing relationships is a visual data representation. Computers provide a powerful tool for producing and presenting visual data representations.

Visual data representations include a variety of well known formats for visually presenting data including bar charts, pie charts, graphs, histograms, diagrams, pictographs, line graphs, maps, and others. Of course, visual data representations also include variations of these formats. In addition, one or more formats may be combined in a single visual data representation. Generally, these visual representations are provided with a certain frame of reference such as a coordinate system or legend.

One type of visual data representation, often not readily recognized, is a map, in particular a geographic map such as a geographic information system (GIS) map. The GIS map may include one or more data sets representing different geographic objects, landmarks, and the like. Alternatively or in addition, other data sets may include the geographic location of customers. Each geographic object may be identified graphically on the map in relation to the others.

Visual data representations provide a mechanism for communicating meaning for a data set in addition to and apart from the raw values within a data set. The visual data representation communicates meaning through position, color, size, relative position, and the like. For example, presenting dollar values in red generally represents some form of deficit. Additionally, a slice on a pie chart quickly communicates the relative proportions of the different categories being presented in the pie chart. Information communicated visually may be referred to as visual semantics. Visual semantics are often used to identify trends within or among data set(s).

Unfortunately, visual data representations are not available to everyone. Those with visual impairments or blindness do not derive the full benefit of the visual semantics a visual data representation provides. In fact, if only a visual data representation is provided, these users may not receive any information regarding the data set(s).

Recently, the Internet and World Wide Web have greatly increased use and dependence on visual data representations (VDR). Charts, graphs, and other graphical representations of information are ubiquitous. Conventionally, to accommodate those who are blind or visually impaired, the VDRs may include a textual description of the VDR and/or the raw data values being represented. The textual description may then be "read" to the visually impaired in a computer synthesized voice using conventional text readers. However, the textual description must be written by one who is not visually impaired. The process of manually creating these textual descriptions is generally cumbersome and tedious. Furthermore, as the number of VDRs being used increases so too does the work of creating textual descriptions.

In addition, the textual descriptions may not be created simply to describe the VDR. The textual description may be generated to describe a conclusion or trend which may be seen visually in the VDR. Alternatively, the textual description may include a bias introduced by the author. To a visually impaired person, such a conclusion may not be readily accepted because the actual raw data is not available to them. Ideally, the textual description should describe the type of VDR, any components of the VDR, and the raw data as included in the VDR. Thus, the visually impaired user is allowed to draw their own conclusions and/or place more trust in conclusions suggested by others.

Furthermore, today, VDRs may be generated automatically from dynamic data sets. A new VDR may be generated to replace an old VDR when the data set changes. The time delay between when the data set changes, and a new VDR is generated, may vary considerably. However, even a delay of one or two days may not be enough time to produce a corresponding textual description, depending on the complexity of the VDR. If the delay is measured in seconds or milliseconds, as may be the case with a stock chart, for example, manually producing a timely textual description may be nearly impossible.

In addition, certain VDRs may be difficult for a user to understand. This may result from poor design or the sophistication of the user. For example, children may still be learning how to read and interpret charts, graphs, and VDRs in general. Unfortunately, the VDRs may not include any aides for such users. Therefore, the information is not conveyed to these users or another must provide assistance.

The challenge faced by the blind and visually impaired has not gone unnoticed by governments. Recent regulations require that websites for government agencies include a textual description for all VDRs being used. As mentioned above, such a requirement can pose a heavy burden on such agencies. In certain circumstances, a decision whether to use continually updated dynamic VDRs may be rejected and a textual description of data may be selected to avoid the current burden of complying with the regulation.

Accordingly, what is needed is a system and method that overcomes the problems and disadvantages of the prior art.

In particular, the system and method should automatically produce a textual description which corresponds to the visual data representation independent of the data set format. The system and method should produce an unbiased textual description for the VDR. In addition, the system and method should automatically generate a textual description for a dynamic, changing, data set. The system and method should generate a textual description which aides understanding of the VDR for those who can see or are otherwise unfamiliar with the VDR. And, the system and method should provide a simple and easy tool to enable compliance with government requirements that textual descriptions be made available.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
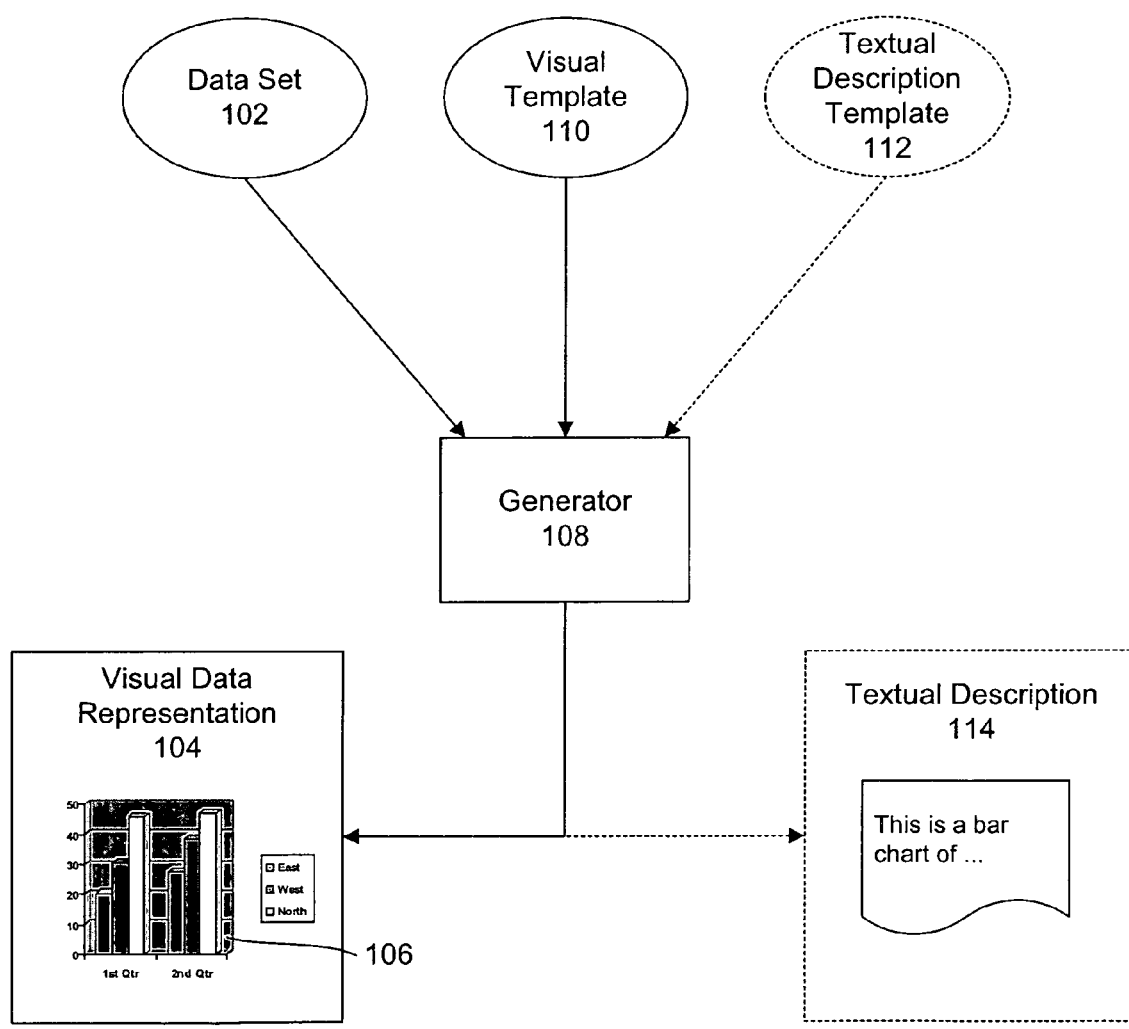
FIG. 1 is a logical block diagram illustrating relationships between components of the present invention.

The present invention relates to a system and method for generating a textual description for a visual data representation that addresses all of the above-identified problems and disadvantages.

In one embodiment, a data set corresponding to a visual data representation (VDR) is accessed. The VDR may be a chart, graph, histogram, diagram, pictograph, map, or the like. Generally, the VDR is generated using the data set and an associated visual template. The data set is the data values which are being represented by the VDR. The data set may be in almost any format. Typically, the data set is formatted into some type of row-column format.

The visual template associated with the VDR is also accessed. Generally, a visual template includes information which identifies the type, format, style, color, orientation and positioning for visual elements of the VDR. Visual elements are generally visual components which may be combined to form a VDR. Examples of visual elements include a title bar, text boxes, lines, points, bars, hash marks, and the like.

Visual elements may also include equations, and interactive elements which allow a user to interact with the VDR. An equation may be provided to compute a percentage, total, maximum value, minimum value, or the like for a subset of the data being displayed. The equation may calculate a result when the VDR is generated. Alternatively, the equation generates a result in response to activation of an interactive element. One example of an interactive element is a popup window, or image, which is activated by a mouse passing over, "flying-over", a visual element. For example, when a user moves the mouse over a slice in a pie chart the percentage represented by the slice may be displayed in a popup display box. Another example, may be an interactive element which is hyperlinked to another chart, graph, or document and is activated by clicking on a visual element.

Next, a textual description template is accessed. Generally, a textual description template is a template which sets forth how a certain type of visual data representation is to be represented in a textual description. Preferably, the textual description template comprises text elements which correspond to visual elements in the visual template. Of course, certain visual elements may not have corresponding text elements.

Then, the visual template is interpreted using the textual description template and data from the data set. Each visual element of the visual template is interpreted in turn. For each visual element which has a corresponding text element, the corresponding text element within the textual description template is identified.

In certain embodiments, a textual description template may include text elements which correspond to a particular human-readable languages. A single textual description template may include text elements for a plurality of human-readable languages. The appropriate text element may be identified by a language identifier.

Next, a textual description element is generated which may incorporate data from the data set. Whether data is incorporated or not depends on the type of text element. Then, the textual description element is stored in a textual description. Of course the textual description template may allow for various textual description formats including plain text, formatted text, XML (Extensible Markup Language), HTML (Hypertext Markup Language), or the like.

The data set, visual template, and textual description template may originate from a variety of sources. For example, each source may be of a different format such as comma delimited, tab delimited, plain text, HTML, and/or XML. Alternatively, the data set, visual template, and/or textual description template may be passed as parameters within a request to generate a textual description. In another alternative, the data set, visual template, or textual description template may be programmatically modified internally or modified in whole or in part by parameters passed within a request.

In another embodiment, the data set, visual template, and/or textual description template may originate from a data base. The data set may comprise a set of data modified during a short time period. Therefore, changes in the data set may cause the visual data representation to be dynamically updated. Accordingly, when the data set and/or visual data representation changes a new corresponding textual description may be generated.

Generation of the textual description may be done essentially any time the data set, visual template, and textual description template have been defined. Thus, the textual description may be generated at about the same time as the visual data representation. The textual description generated may be stored for use later. Alternatively, the textual description may be generated on demand as needed.

In another embodiment, a request to generate a textual description is received. The request may come from software used to generate or define the visual data representation. Alternatively, the request may be received over a network. The request may be automatically generated or originate from a user. In response to the request, a textual description may be provided to the sender of the request.

In certain embodiments, only the generated textual description is presented to the user. In others, the generated textual description may be provided along with the visual data representation. For example, the generated textual description may be displayed in a first window and the visual data representation may be displayed in a second window. Thus, a user may compare the visual data representation to the generated textual description.

Thus, the present invention allows a textual description to be pre-generated or on demand. The textual description may be generated for static or dynamic data sets. And, the textual description corresponds to the visual data representation to convey substantially the same information textually as conveyed visually.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, data sources, variables, parameters, etc. In other instances, well-known structures, materials, or operations are not shown or described in detail to avoid obscuring aspects of the invention.

Referring now to FIG. 1, a logical diagram illustrating components of a system 100 for dynamically generating a textual description for a visual data representation is illustrated. The system 100 includes a data set 102. The data set 102 includes data which is related in some manner. The data set 102 is the raw data, typically, numbers which are to be represented in a visual data representation (VDR) 104. Of course the data set 102 may be structured in almost any format. For example, the data set 102 may comprise a flat file of delimited data values. Alternatively, the data set 102 may comprise rows and columns of one or more tables in a database. Furthermore, the data set 102 may comprise a query for a database. Preferably, the data set 102 comprises a data structure which allows quick access to raw data values in the data set 102. The data values may be numbers, strings, binary values, hex values, images, objects, or other data.

As mentioned above, a VDR 104 is a graphical representation for the data in the data set 102. Generally, there are a plurality of different types of VDRs 104. For example, in FIG. 1 a bar chart 106 is one type of VDR 104. Data values within the data set 102 indicate how high a single bar is to be drawn. The data set 102 also identifies how many different types of categories, or bars will be displayed. Other types of VDRs 106 include pie charts, area graphs, line graphs, radar charts, XY line graphs, timelines, geographic maps, and the like.

Generally a VDR 104 conveys much more information than examining raw data alone. For example, in the bar chart 106, relationships between bars are quickly seen visually instead of performing a mental comparison of maximum values in different categories from the data set 102. This visual information can be very persuasive.

The VDR 104 may comprise a static graphic image such as a GIF (Graphic Interchange Format) or PNG (Portable Network Graphics) file. Preferably, the VDR 104 comprises an interactive image such as Flash or SVG (Scalable Vector Graphics) object which allows the user to interact with the VDR 104. Interactions available may include a popup display which displays in response to a user moving the mouse over certain areas of the VDR 104. In addition, a user may click, or otherwise select, certain portions of the VDR 104 which may display more information relating to the data set 102. The additional information may be presented for example in a web page of a browser along side or in place of the displayed VDR 104.

Preferably, the VDR 104 is generated by a generator 108. The generator 108 comprises one or more software modules programmed to create a VDR 104 using the data set 102. The generator 108 accesses the data set 102 and produces the desired VDR 104.

Preferably, the generator 108 accesses a visual template 110 to identify the type of VDR 104 to be generated. In addition to the type, the visual template 110 sets forth the layout, colors, format, and general 'look and feel' for the VDR 104. The visual template 110 may also indicate how the data set 102 is to be interpreted to generate the VDR 104.

For example, the visual template 110 may indicate that a bar chart 106 is to be produced. The visual template 110 may designate a specific color for each bar, the width of the bars, the scale for the coordinate system, whether the chart is three-dimensional, the size of the chart, whether the VDR 104 is to be static or interactive, and the like. By using a visual template 110, the generator 108 is capable of quickly regenerating the VDR 104 should the data set 102 change.

VDRs 104 provide a valuable mechanism for conveying information regarding data sets 102. Typically, the VDR 104 conveys semantics beyond those readily apparent from simply reviewing raw data in the data set 102. VDRs 104 also convey a certain impression depending on the type of VDR 104 used and even the color. For example, bars in a bar chart which are neon color tend to attract more attention from the user.

However, the benefits of using VDRs 104 are often lost on those who are blind, visually impaired, or incapable of understanding the VDR 104. While VDRs 104 may be described orally or visually, this still may not help one who is learning how to interpret VDRs 104. In addition, the data set 102 and hence the corresponding VDR 104 may change quickly. It may not be possible to produce a new textual description manually each time the data set 102 changes. The present invention addresses these shortcomings.

In the depicted embodiment, the generator 108 accesses a textual description template 112. Preferably, the textual description template 112 is associated with the visual template 110. The textual description template 112 defines how elements within the visual template 110 should be represented textually. The textual description template 112, together with the data set 102, and visual template 110 enables the generator 108 to generate a textual description 114 which corresponds to the VDR 104.

It should be noted that the textual description template 112 is associated with the visual template 110 rather than the data set 102 such that visual semantic information available within the particular type of VDR 104 is appropriately conveyed in a textual description 114. For example, a bar chart description is a type of textual description 114 associated with bar charts 106. Certain text such as "This is a bar chart of . . . " may convey additional information to users of the textual description 114 familiar with the visual semantic information bar charts 106 convey.

Thus, the same system 100 which produces VDRs 104 from a data set 102 and a visual template 110 also produces textual descriptions 114 by simply providing access to a textual description template 112. The generator 108 accesses the data set 102, visual template 110, and textual description template 112. Next, the visual template 110 is interpreted using the textual description template 112 and data from the data set 102. Based on the interpreted visual template 110, a textual description 114 is generated which corresponds to the VDR 104.

As with VDRs 104, the textual description 114 may include an interactive element (not shown) which allows a user to interact with the textual description 114. The interactive element generally provides access to one or more sections of the textual description 114. For example, if a bar of a bar chart VDR 104 represents a total for a number of sub-categories, a hyperlink may be provided in the textual description 114 following the sentence describing the bar and its data values. Activation of this hyperlink may present another textual description 114 which displays the sub-categories and their corresponding values. Presenting additional data in such a manner is referred to as "Drill-Down". The additional data may be raw, formated, unformatted, a graphic, an icon, a symbol or the like. One VDR 104 or textual description 114 represents an abstraction of more detailed information which is made accessible to a user through interactive elements in the VDR 104 and textual description 114. Preferably, the interactive elements allow for drill-down to additional detailed textual descriptions.

Figure 2:
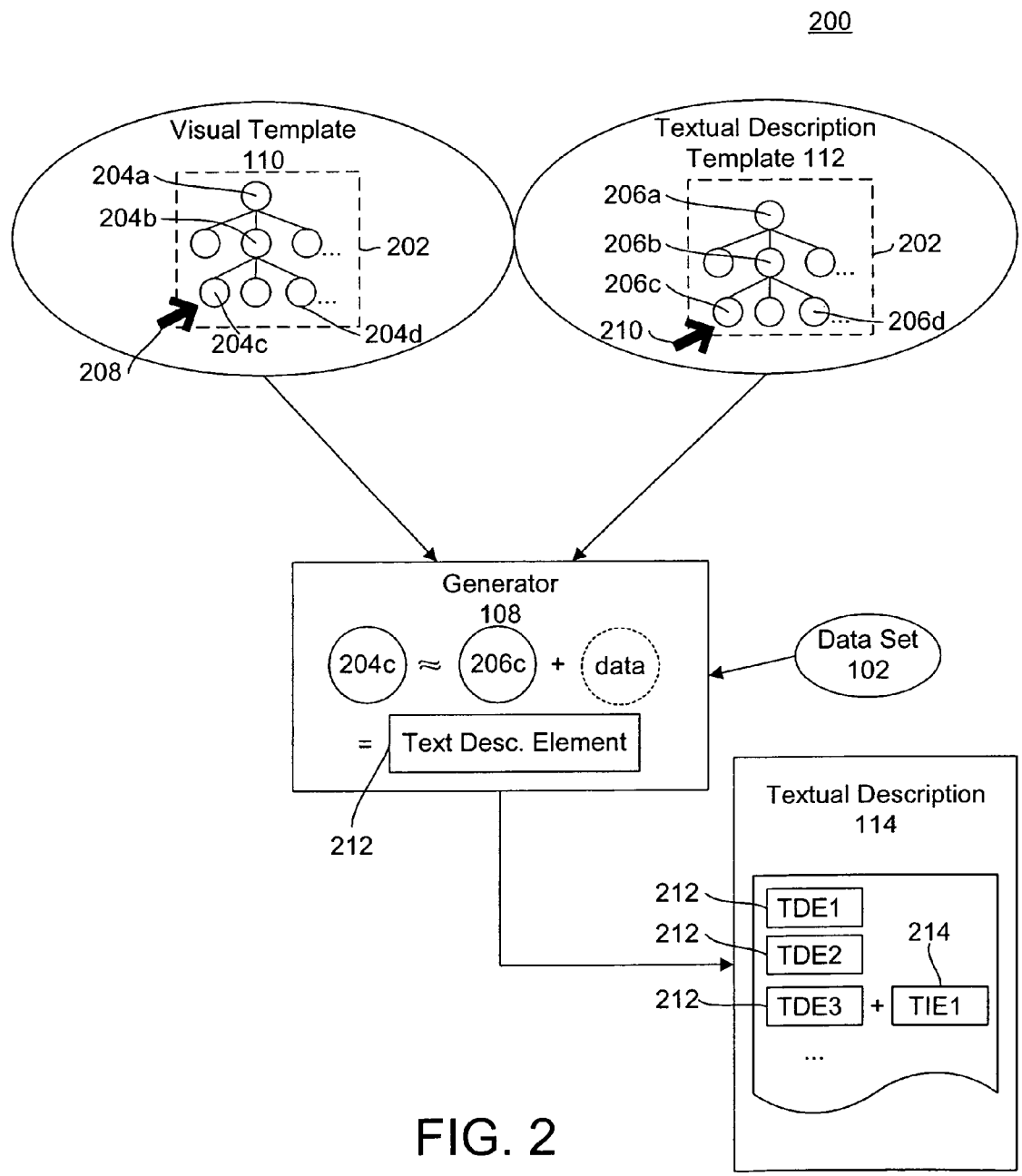
FIG. 2 is a block diagram of sub-components used to generate a textual description according to one embodiment.

Referring now to FIG. 2, a block diagram illustrates sub-components of a system 200 according to one embodiment. Preferably, the system 200 comprises a data set 102, visual template 110, textual description template 112, and generator 108 as described above. As mentioned, the visual template 110 is a framework for generating the VDR 104. The visual template 110 provides instructions for the type, size, color, dimensions, scale, and other properties of the VDR 104. For example, the visual template 110 may define how many axes a VDR 104 may have, what the titles for the axes are, and how hash marks are to be distributed along the axes.

In one embodiment, the visual template 110 provides these instructions in a hierarchical tree structure 202 of visual elements 204. Of course, the visual elements 204 may be organized according to different structures as well. The tree structure 202 provides a data structure which allows quick access to any visual element 204 of the tree 202. Preferably, the tree 202 includes a root visual element 204*a* which serves as a starting point for searching the tree 202. The root visual element 204*a* may comprise the type of VDR 104 which the visual template 110 produces. Branches and sub-branches from the root 204*a* may be quickly traversed to find a visual element 204 of interest. Visual elements 204 linked to the root 204*a* by branches and sub-branches may be referred to respectively as children and grand-children of the root 204*a*.

Each visual element 204 may be composed of one or more visual elements 204. A visual element 204 is a machine-readable instruction for how a corresponding visual element of the VDR 104 is to be drawn, colored, sized, etc. For example, one visual element 204*b* may indicate that a background is to be drawn behind all the visual elements 204 of the VDR 104. Branching from the background visual element 204*b* may be a visual element 204*c* which indicates the color or pattern for the background.

Other visual elements 204 may correspond to data values in the data set 102. For example, one visual element 204 may be a bar having a width of three and a height equal to a value from the data set 102. Still other visual elements 204 may include interactive elements 204*d*. The interactive elements 204*d* define what interactive action is to be available in the VDR 104, what triggers the action, and which visual element 204 the action is associated with.

Referring still to FIG. 2, preferably, the textual description template 112 comprises a tree structure 202 of text elements 206 which are also organized hierarchically with a text element root 206*a*. A text element 206 is a textual description for a corresponding visual element 204 in the visual template 110. When properly organized, the text elements 206 form sentences. For example, a text element 206*b* corresponding to a visual element 204 for a first bar indicating sales in January in a bar chart may produce a text phrase such as "Group 1." Alone, one text element 206 generally has little meaning. However, when a number of text elements 206 are combined in an appropriate order, sentences describing visual elements 204 may be formed.

The generator 108 interprets the visual template 110 using the textual description template 112 and the data set 102 to generate a textual description 114. More specifically, the generator 108 systematically processes the visual elements 204 of the visual template 110.

In one embodiment, the generator 108 interprets the visual template 110 by traversing the tree 202 in a breadth first manner. Of course, other methods of traversal may be used depending on how the visual elements 204 are organized. Arrow 208 indicates the current visual element 204 as the generator 108 interprets the visual template 110.

A formula illustrated within the generator 108 provides an example of operation of the generator 108. In one embodiment, the generator 108 interprets the current visual element 204*c*. Generally, interpretation involves identifying the type of visual element 204, how many children visual elements 204 are to be expected, and/or what type of text element 206 corresponds to the current visual element. Of course, other information relevant to generating a textual description 114 may also be gathered from the current visual element 204*c*.

Next, the generator 108 identifies the text element 206*c* which corresponds to the current visual element 204*c*. The arrow 210 indicates an identified corresponding text element 206*c*. Preferably, one text element 206*c* may be used with a number of visual elements 204*c*. Alternatively, the text element 206*c* corresponds uniquely to the current visual element 204*c*. The corresponding text element 206*c* is identified by matching the type of the current visual element 204*c* to the type of text element 206*c*. The tree structure 202 for the text elements 206 allows for quick identification of the corresponding text element 206*c*.

For example, the visual element 204*c* may represent a bar in a bar chart. The corresponding text element 206*c* may be identified for all bars of the chart because the variation in the bars of a bar chart may only depend on the data values in the data set 102. The similarity symbol indicates that the visual element 204*c* is substantially equivalent to the identified text element 206*c*. Generally, the identified text element 206*c* is not exactly equal because, as mentioned above, visual semantic differences may exist between the visual elements 204 the corresponding text elements 206.

Based on the visual element 204*c* and text element 206*c*, the generator 108 generates a textual description element 212. Depending on the type of visual element 204*c* being interpreted, the textual description element 212 may include one or more data values from the data set 102. So, continuing the example above, the textual description element 212 may be "Group 1, January" where January is the data value for the x-axis of the bar in the bar chart.

Each textual description element 212 (TDE) generated may be stored within a textual description 114. Preferably, the textual description elements 212 are stored within a text document. The textual description 114 may be organized and formatted according to an XML (extensible Markup Language) format or HTML (HyperText Markup Language) format. These formats are preferred because the formats are machine-readable textual code which people can also easily read and modify if necessary. Of course, the textual description 114 may be organized according to other formats as well.

The generator 108 then continues with the next visual element 204 of the tree structure 202 and repeats the steps until all the visual elements 204 have been interpreted. If a visual element 204 does not have a corresponding text element 206, that visual element 204 is simply ignored and the next one is interpreted. The result is a complete textual description 114 which is associated with a particular VDR 104.

As mentioned above, certain visual elements 204 may comprise interactive elements 204d. In a similar fashion, the generator 108 interprets the interactive elements 204d and generates a textual description element 212 which includes a textual interactive element (TIE) 214. Preferably, the textual interactive element 214 comprises a hyperlink to another web page or document which is related to a specific visual element 204 such as a pie slice.

FIG. 2 illustrates the visual template 110, textual description template 112, and data set 102 as distinct data sources. However, in certain embodiments, the data sources may be combined in any combination necessary to suit the particular embodiment. For example, a single data source, such as a file, may contain both the visual template 110 and textual description template 112. Alternatively, the visual template 110 may include its corresponding data set 102. Furthermore, each of the sources 110, 112, 102, may be stored in one or more databases.

In a preferred embodiment, the visual template 110, textual description template 112, and data set 102 are represented using an XML data structure. Alternatively, another markup language format may be used to provide a corresponding data structure for the visual template 110, textual description template 112, and data set 102. The markup language format may be HTML, XML or some other variant of a markup language format. XML data structures may be stored in files or memory of a computer. The XML format provides a very flexible data source which allows the visual template 110, textual description template 112, and/or textual description to be combined in a single file. Use of XML formats for the visual template 110, textual description, and/or data set 102 allows these different kinds of information to be easily searched and distinguished using begin and end tags. Each tag may be used to identify what information is contained within the begin and end tag.

In addition, XML allows for custom tags to be used which allows the system 200 to easily adapt to different needs. Furthermore, HTML and XML formats allow elements and sub-elements to be nested within tags. This nesting allows for implementation of tree structures 202 like those discussed above.

Figure 3:
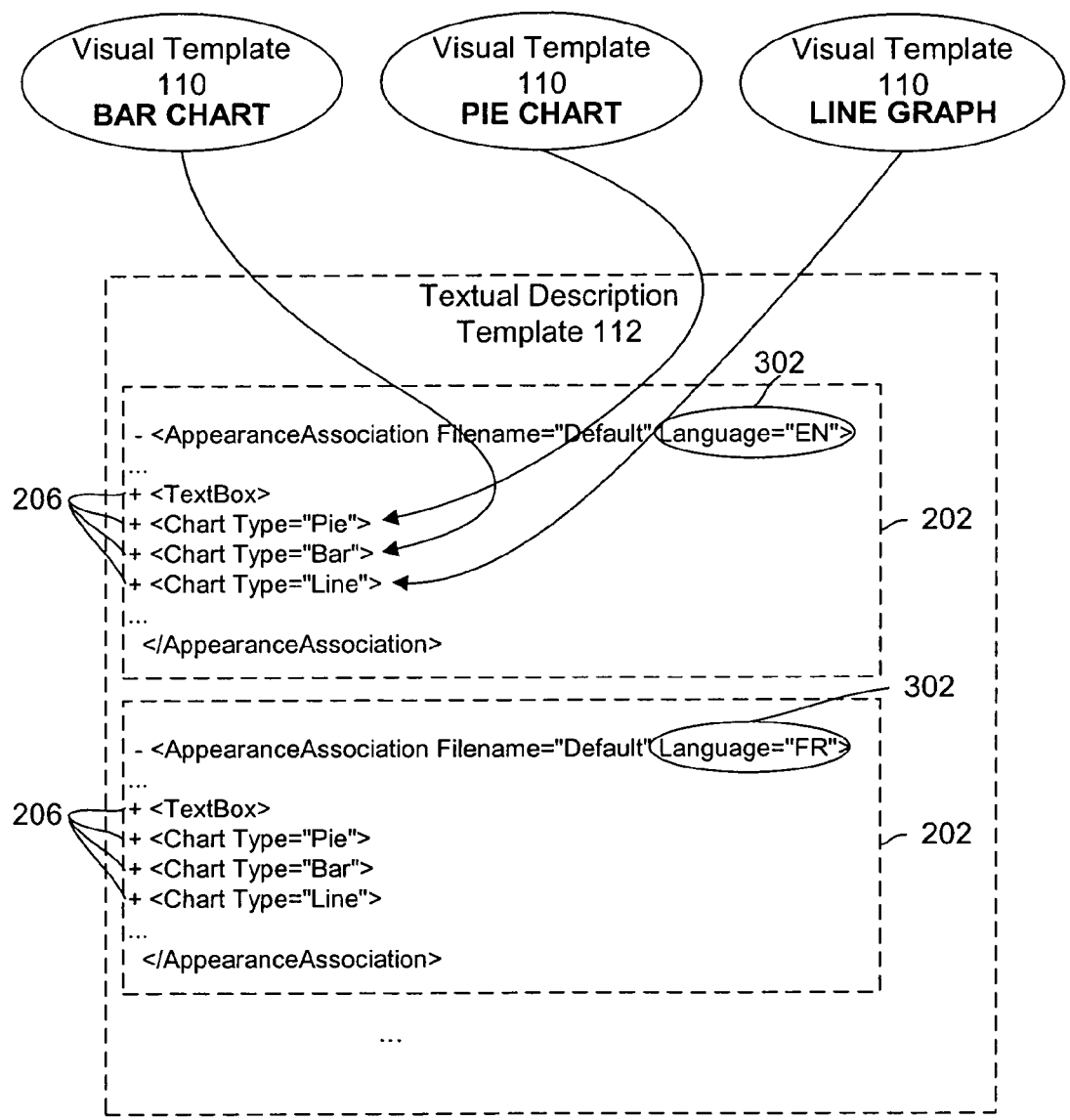
FIG. 3 is a block diagram illustrating various components of a textual description template according to one embodiment of the present invention.

Referring now to FIG. 3, an alternative system 300 is illustrated. In this embodiment, the text elements 206 are organized into a plurality of tree structures 202. While VDRs 104 using numbers tend to be understood by users who speak different languages, textual descriptions 114 in a single language generally are not. Therefore, in the illustrated embodiment, a tree structure 202 may be provided containing text elements 206 for a particular human-readable language.

When the generator 108 begins generating the textual description 114 a language identifier 302 may be provided designating the human-readable language for the textual description 114. For example, if the language identifier 302 is "FR" for French, the generator 108 interprets the visual template 110 using the tree structure 202 for which Language="FR". Accordingly, the structure and text for the text elements 206 of the French tree structure 202 may be defined according to French grammar and words. Of course, a single textual description template 112 may include a tree structure 202 for other human-readable languages such as Spanish, Greek, Dutch, German, and the like.

In certain embodiments, the textual description template 112 may be used to format the data set 102 into a format other than a human language grammar. For example, instead of text for the English language, each text element 206 may include machine-readable textual code such as HTML code. Thus, by providing a tree structure 202 which includes HTML code and a "language=HTML" the textual description 114 generated may be an HTML table or other formatted tabular representation of the data set. The textual description 114 may be a delimited format such as comma or tab delimited. Alternatively, the textual description template 112 may be used to produce an XML table, plain text file, or formatted text file.

FIG. 3 also illustrates that a single tree structure 202 within a textual description template 112 may support a number of visual templates 110. For example, visual templates 110 for a "Bar Chart", "Pie Chart", "Line Graph", and others may be included. Each type of visual template 110 may be supported by a corresponding sub-tree (indicated by the arrows) within the tree structure 202. The plus sign indicates that the tree expands to display the children and grand-children of each chart type.

Figure 4:
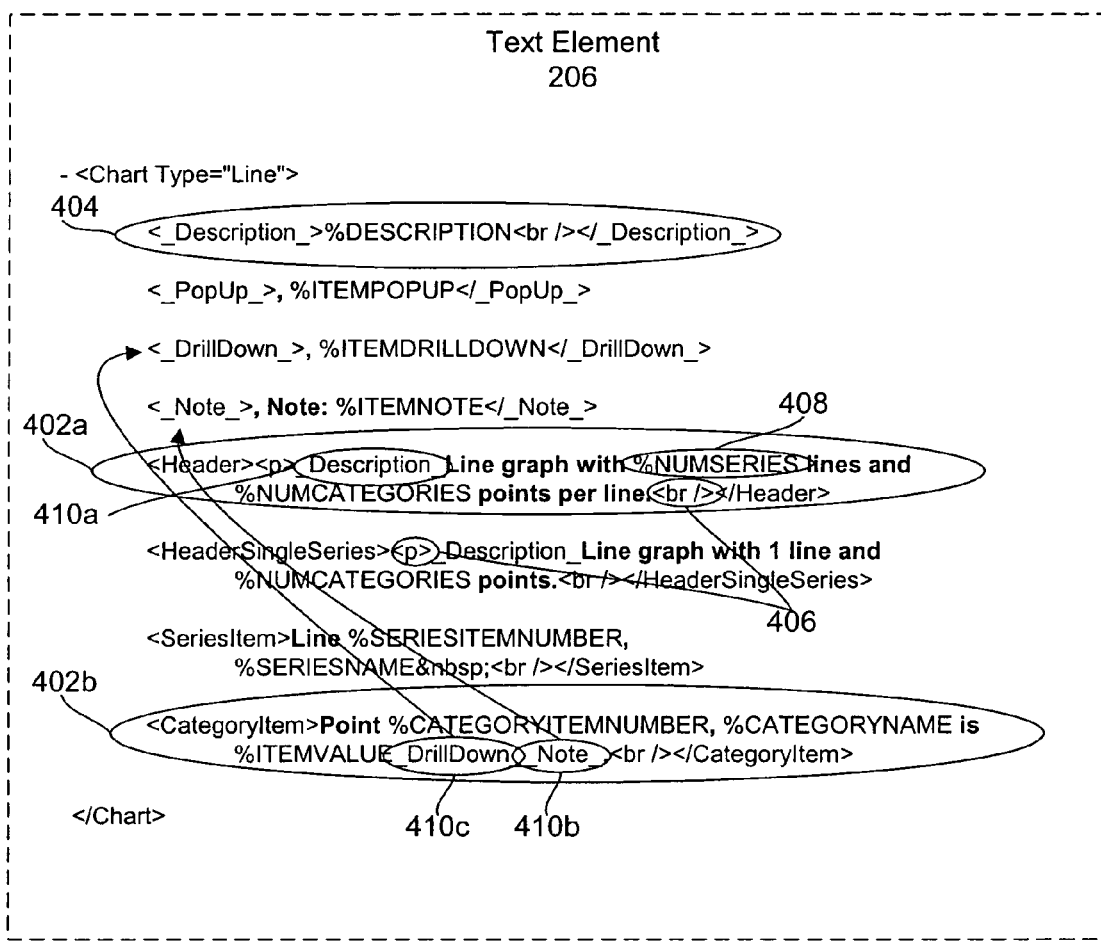
FIG. 4 is a block diagram illustrating various components of a text element according to one embodiment of the present invention.

FIG. 4 illustrates one embodiment of a text element 206. Preferably, the text element 206 comprises leaf text elements 402 and substitution elements 404. Leaf text elements 402 and substitution elements 404 are generally elements 206 of the tree structure 202 which have no children elements 206. The leaf text elements 402 include the raw text which will be used to create the textual description element 212. In FIG. 4, the raw text is indicated in bold for clarity. However, the text is generally not in a specific font or font style, although it may be.

In addition, the leaf text elements 402 may include formatting codes 406. The formatting codes 406 provide formatting commands for the software which displays the text. For example, the formatting code 406 "<p>" indicates to an HTML or XML browser that the following text is to begin in a new paragraph.

Preferably, the leaf text elements 402 include substitution tokens. Specifically, the leaf text elements 402 may include a data value token 408 and/or a text element token 410. A data value token 408 serves as a place holder in the leaf text element 402 for a data value from the data set 102. The generator 108 determines which data values in, or derived from, the data set 102 correspond to the data value token 408. The generator 108 replaces the data value tokens 408 with data values when generating the textual description element 212. Data value tokens 408 may be identified by a special character such as a "%" symbol followed by a name for the data value token 408. One example, is "% NUM- SERIES" which is replaced with "3" or "three" in the case of a line graph having three lines.

A text element token 410 is a place holder for an additional portion of a text. The text element token 410 indicates that a substitution element 404 is to be placed within the leaf text element 402 at the position of the text element token 410. The text element token 410 is distinguishable from the other text by a special character such as an underscore symbol, "_", on both sides of the name of the substitution element 404 to be used. Of course other symbols and methods of identification may be used.

In the displayed embodiment, a "_Description_" text element token 410*a* in leaf text element 402*a* causes the generator 108 to find the corresponding "_Description_" substitution element 404. The generator 108 replaces any data value tokens 408 and any nested substitution elements 404 in the substitution element 404. Next, the generator 108 replaces the text element token 410*a* with the processed substitution element 404 which now comprises plain text, data values, and/or formatting codes 406.

Text element tokens 410 and substitution elements 404 allow the textual description template 112 to be modified programmatically. In other words, the textual description element 212 generated for a given leaf text element 402 may vary based in the data and how the substitution elements 404 are defined. For example, in leaf text element 402*b*, the text element token 410*b* ("_Note_") is processed. If % ITEMNOTE data is available, the "_Note_" substitution element 404 is included in the textual description element 212. If no % ITEMNOTE is available, none of the "_Note_" substitution element 404 is included. Thus, the content of the textual description element 212 may be controlled by use of substitution elements 404 and the data values.

In certain embodiments, the leaf text element 402 identified may depend on the cardinality of sub-sets of data within the data set 102. For example, a root visual element 204*a* may correspond to a leaf text element 402, having a "<header>" tag, which introduces the VDR 104. However, the appropriate leaf text element 402 may vary slightly depending on cardinality of data in the data set 102.

Suppose the VDR 104 is a line graph. The line graph may include one or more lines. Therefore, if the data set 102 only includes data for one line having five points, the header for the description should say "Line graph with one line and five points." (the "<HeaderSingleSeries>" tag) If the data set 102 includes data for three lines, the header for the description should say "Line graph with three lines and five points per line." (the "<Header>" tag) These two sentences differ slightly, but if the wrong one is used, the discrepancy is readily apparent.

In one embodiment, the substitution elements 404 and corresponding text element tokens 410 may be used to generate textual interactive elements 214. Generally, a textual interactive element 214 is a hyper-link to another VDR 104, or textual description 114. Textual interactive elements 214 may be associated with an individual bar or pie slice, with the graph as a whole, with a point on a line graph as well as other visual elements 204 of the VDR 104.

These visual interactive elements 204 may be accommodated in the leaf text element 402 using text element tokens 410. For example, leaf text element 402*b* includes text element token 410*c*, "_DrillDown_". If % ITEMDRILLDOWN data exists, the comma and space are included along with a text hyperlink to a page which includes additional information or data relating to the particular leaf text element 402*b*.

Figure 5:
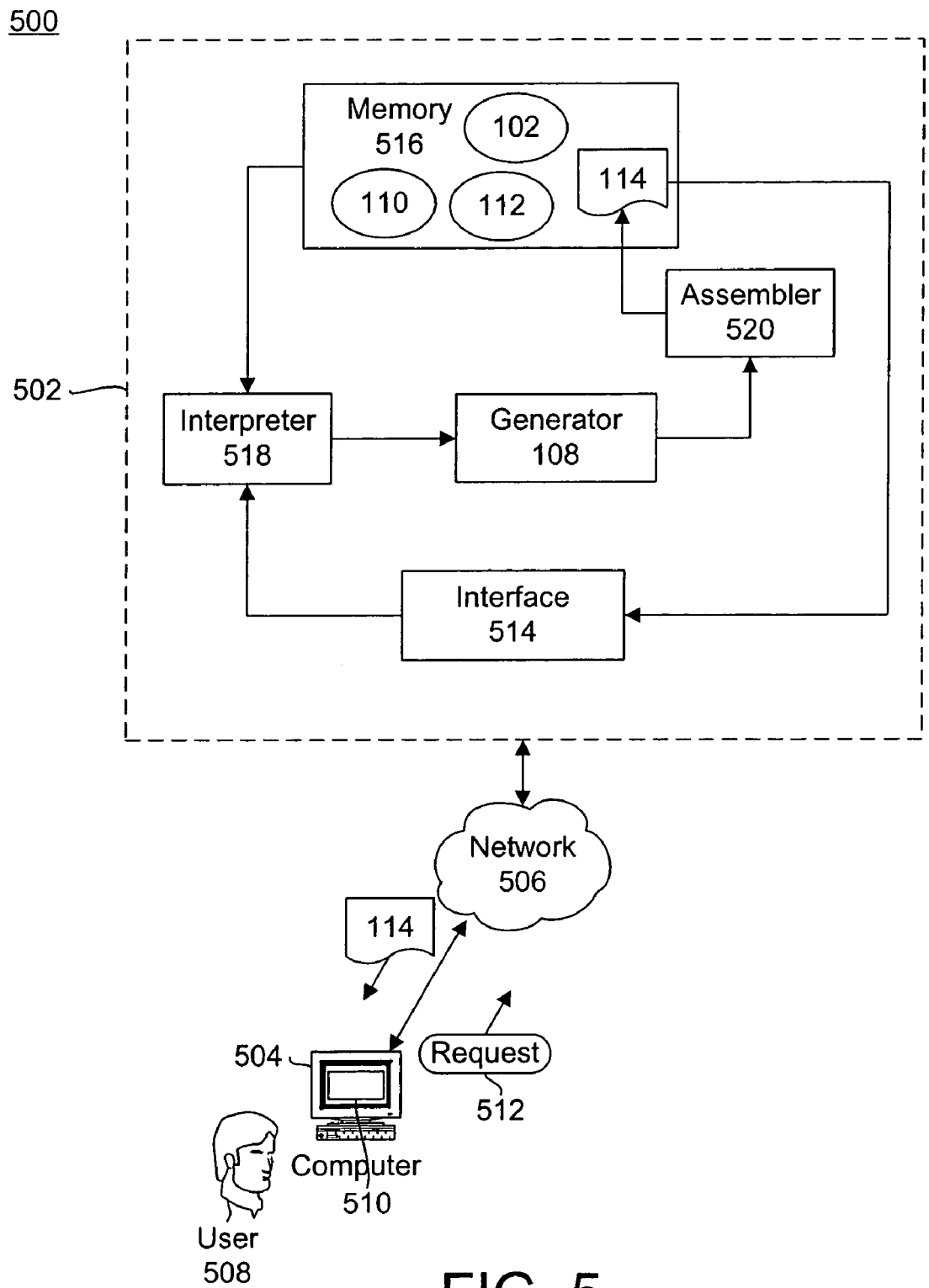
FIG. 5 is a block diagram of components of a system according to one embodiment of the present invention.

Referring now to FIG. 5, a system 500 which implements the present invention is illustrated. Preferably, the system 500 is implemented in a computer such as a server 502. The server 502 communicates with one or more user computers 504 via a network 506. Generally, the server 502, user computers 504 and network 506 are conventional devices.

The operation of the system 500 will now be described. Suppose a user 508 views a VDR 104 on his or her computer 504 using conventional display software 510 such as a word processor, web browser, or other client software 510 capable of displaying the VDR 104. The VDR 104 may provide an indication that a textual description 114 is available. In one embodiment, a hyperlink of a capital "D" enclosed in square brackets positioned as a subscript to the VDR 104 may be used on a website or other document which includes the VDR 104.

Next, the user 508 issues a request 512 for the textual description 114 corresponding to the VDR 104. The request 512 may be issued by selecting a "[D]" hyperlink or other user interface control in the software 510. Alternatively, the client software 510 may be configured to automatically generate and issue the request 512 based on a computer system event or the passage of time. For example, stock ticker software 510 may periodically issue a request 512 to get a textual description 114 corresponding to the most recent stock data.

The request 512 may include an identifier for a particular VDR 104. From the identifier, the system 500 may identify and locate the proper data set 102, visual template 110, and textual description template 112 to be accessed to generate the textual description 114 associated with the VDR 104. Alternatively, the request 512 may include one or more parameters which identify single or plurality of different sources for the data set 102, visual template 110, and/or textual description template 112. The parameters may be file names, URLs (Uniform Resource Locator), IP (Internet Protocol) addresses, and the like which point to sources such as files, databases, web servers, web services providers, and the like.

In yet another alternative, the parameters of the request 512 may include a complete data set 102, visual template 110, and/or textual description template 112. In one embodiment, the request 512 comprises a string of HTML or XML code which includes tags to indicate what portion of the request 512 is the visual template 110, data set 102, and/or textual description template 112. So, the data 102 and templates 110, 112 may be located on the user computer 504. Default data sets 102, and templates 110, 112 may be stored on the server 502. If a data set 102 and/or template 110, 112 is included in the request 512, the default data 102 and/or template 110, 112 may be overridden by data 102 and/or templates 110, 112 provided in the request 512.

By including a template 110, 112, in the request 512, a user 508 can programmatically modify the default templates 110, 112 which the server 502 might ordinarily use. In addition, portions of templates 110, 112 may be overridden by including a parameter which includes the elements of the template 110, 112 to be modified. For example, a textual description template 112 parameter in the request 512 may include an override leaf text element 402 for the "<Header>" leaf text element 402*a*.(See FIG. 4) Thus, the user 508 may programmatically customize the look, feel, and content of the textual description 114 generated by the parameters of the request 512.

Referring still to FIG. 5 and generally to FIG. 2, the request 512 is sent over a network 506 to a server 502. The network 506 may comprise a LAN (Local Area Network), WAN (Wide Area Network), and/or the Internet using wired or wireless links. Of course those of skill in the art will recognize that the components of the server 502 may be implemented in the user's computer 504 such that no external communication of the request 512 is necessary.

In one embodiment, the request 512 is received by an interface component 514. The interface component 514 receives requests 512 and sends generated textual descriptions 114 back over the network 506 to the user 508. In one embodiment, the interface component 514 accesses and loads the data set 102, visual template 110, and textual description template 112 into the memory 516 of the server 502. Whether the memory 516 is RAM, ROM, or a storage device is not crucial to the present invention. Each of these types of memory 516 may be used.

The interface component 514 communicates with an interpreter 518. The interpreter 518 accesses the memory 516. The interpreter 518 interprets each visual element 204 of the visual template 110. For each visual element 204 a corresponding text element 206 may be identified. Of course, each visual element 204 may not have a corresponding text element 206. For example, a border visual element 204 may not have a corresponding text element 206.

The interpreter 518 communicates with a generator 108. The generator 108 accesses the identified visual element 204 and corresponding text element 206 in memory 516. As described above, the generator 108 uses the visual element 204 and text element 206 to generate a textual description element 212. If the text element 206 includes data value tokens 408, data values from the data set 102 are incorporated into the text element 206 to generate the textual description element 212.

The generator 108 communicates the textual description element 212 to an assembler 520. The assembler 520 gathers and organizes one or more textual description elements 212 into a textual description 114 associated with a particular VDR 104. The textual description 114 may be assembled in memory 516. Preferably, the system 500 iterates through each visual element 204 in the visual template 110. Visual elements 110 which have corresponding text elements 206 result in textual description elements 212. Of course the generator 108 may recurse through the text elements 206 until all nested data value tokens and text element tokens 410 are replaced with appropriate values.

Once the textual description 114 is completed, the assembler 520 may signal the interface component 514. Upon receiving the signal, the interface component 514 sends the textual description 114 back to the computer 504 in response to the request 512.

Once received by the computer 504, the software 510 may display the textual description 114 in place of the VDR 104. In certain embodiments, the textual description 114 is displayed in another user interface window. In other embodiments, the software 510 may continue to display the VDR 104 while the textual description 114 is sent to a disability aid software package (not shown) such as an audio text reader. The disability aid software package may "read" the textual description 114 to the user 508 using a computer synthesized voice.

Figure 6:
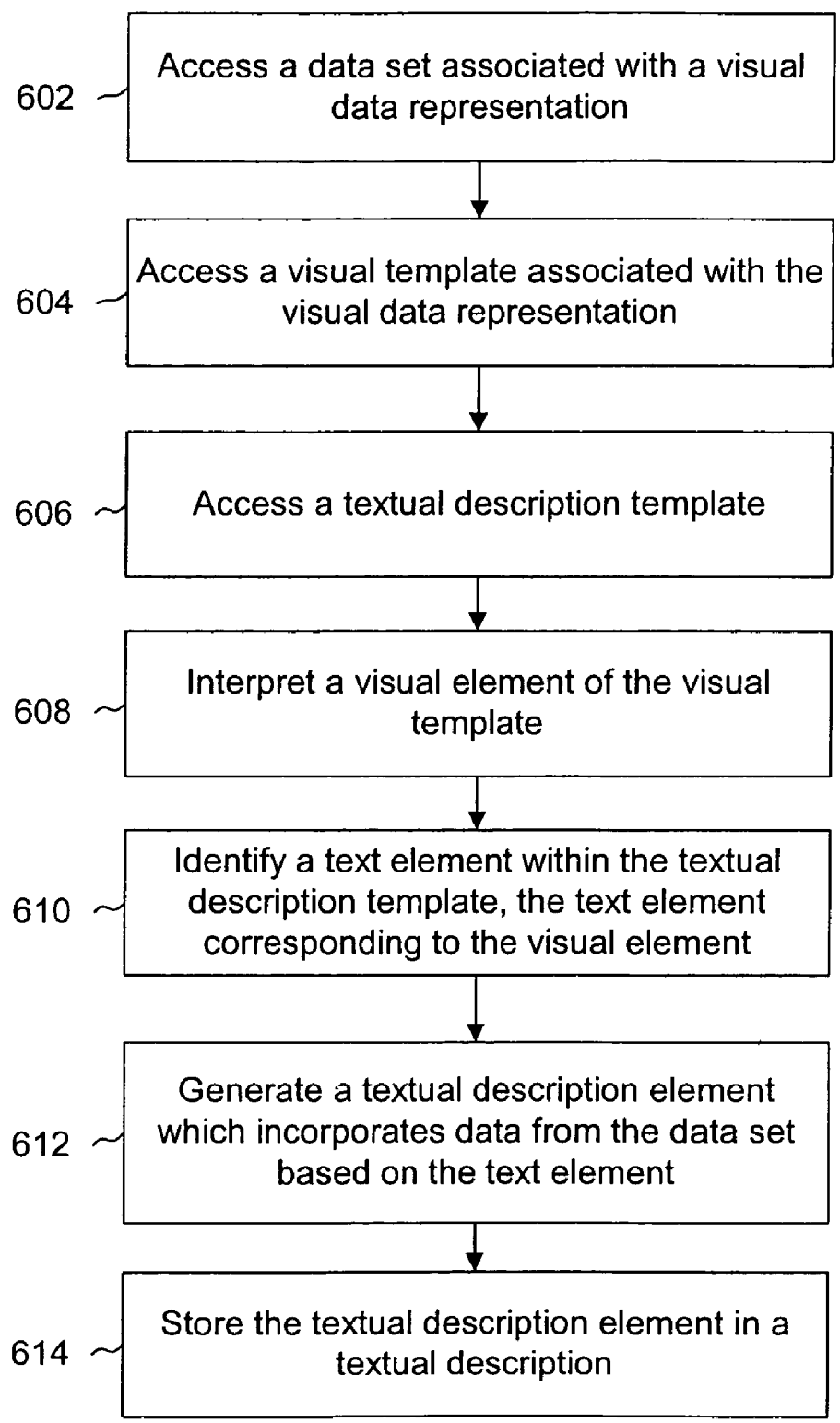
FIG. 6 is a flowchart of a method for dynamically generating a textual description for a visual data representation.

FIG. 6 illustrates a flowchart of a method 600 for generating a textual description 114 for a VDR 104. Referring generally to FIGS. 1–2 and specifically to FIG. 6, the method 600 begins by accessing 602 a data set 102 associated with the VDR 104. The data set 102 may be accessed on a variety of sources. The visual template 110 associated with the VDR 104 and textual description template 112 are also accessed 604, 606.

Thereafter, visual elements 204 of the visual template 110 are interpreted 608. For certain visual elements 204 a corresponding text element 206 may be identified 610 within the textual description template 112. Next, based on the identified text element 206, a textual description element 212 is generated 612 which may incorporate data from the data set 102. Each textual description element 212 generated may then be stored 614 in a textual description 114. Once all the visual elements 204 have been interpreted, the completed textual description 114 may be sent in response to a request 512.

In certain embodiments, the method 600 may be implemented for interactive web-based charts (not shown). Interactive web-based charts are VDRs 104 which are available for viewing in a web browser and provide interactive capabilities. Often, the interactive web-based charts are produced from dynamic data sets 102 which may change without notice. The interactive web-based charts allow for VDRs 104 to be produced periodically to visually track changes in the data set 102. Similarly, certain embodiments of the present invention may be used to produce textual descriptions 114 which correspond to the interactive web-based charts.

In one embodiment, a request 512 to generate a textual description 114 may be received each time the data in the data set 102 changes by a certain magnitude. The dynamically changing data set 102 may then be used to generate a textual description 114 according to a method similar to that described in relation to FIG. 6.

Based on the foregoing, the present invention offers a number of advantages not available in conventional approaches. The present invention automatically produces a textual description which corresponds to the visual data representation independent of the data set format. The textual description provides an unbiased description of the data and the visual data representation. The present invention may automatically generate a textual description for a dynamic, changing, data set. The present invention also generates a textual description in a manner which aides understanding of the visual data representation for those who can see or are otherwise unfamiliar with the visual data representation. The present invention also facilitates compliance with government regulations for providing textual descriptions to accompany visual data representations.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for dynamically generating a textual description for a computer-generated visual data representation, the method being performed by a computing device, the method comprising:

accessing a data set corresponding to the computer-generated visual data representation;

accessing a visual template associated with the computer-generated visual data representation, wherein the visual template comprises information about a visual characteristic of the computer-generated visual data representation;

accessing a textual description template;

interpreting the visual template using the textual description template and data from the data set to generate a textual description which describes the visual characteristic of the computer-generated visual data representation, wherein the textual description comprises visual semantic information available within the computer-generated visual data representation.

2. The method of claim 1, wherein interpreting comprises:
interpreting a visual element of the visual template;
identifying a text element within the textual description template, the text element corresponding to the visual element;
generating a textual description element which incorporates data from the data set based on the text element; and
storing the textual description element in a textual description.

3. The method of claim 2, wherein the visual element comprises a visual interactive element for allowing a user to interact with the visual data representation and wherein the generated textual description element comprises a textual interactive element for providing substantially the same interactive functionality within the textual description as the visual interactive element.

4. The method of claim 1, wherein the textual description template is modified programmatically.

5. The method of claim 1, wherein the textual description comprises text in one of a plurality of human-readable languages.

6. The method of claim 1, wherein the textual description is a formatted tabular representation of the data set.

7. The method of claim 1, further comprising:
receiving a request to generate a textual description for the visual data representation.

8. The method of claim 7, wherein the request is automatically generated.

9. The method of claim 7, wherein the request originates from a user, the method further comprising:
sending the generated textual description over a network to the user.

10. The method of claim 7, wherein the request comprises a data set, a visual template, and a textual description template.

11. The method of claim 1, wherein at least one of the data set, the visual template, and the textual description template are accessed through a different data source.

12. The method of claim 1, wherein at least one of the data set, the visual template, and the textual description template are modified programmatically.

13. The method of claim 1, wherein the textual description template is associated with a plurality of visual templates.

14. The method of claim 1, wherein a language identifier is accessed to identify the language for the textual description and wherein the textual description template comprises text elements associated with the identified language.

15. The method of claim 1, wherein the data set and visual template are integrated within a single XML data structure.

16. The method of claim 13, wherein the textual description template comprises an XML data structure.

17. The method of claim 1, wherein the textual description comprises plain text.

18. The method of claim 1, wherein the textual description comprises formatted text.

19. The method of claim 1, wherein the textual description comprises machine-readable textual code.

20. The method of claim 1, further comprising:
displaying the textual description to a user.

21. The method of claim 20, wherein displaying comprises:
displaying the visual data representation in a first window; and
displaying the textual description in a second window on a common display device.

22. A system for dynamically generating a textual description for a computer-generated visual data representation, the system comprising:
a memory comprising a data set corresponding to the computer-generated visual data representation, a visual template associated with the computer-generated visual data representation and a textual description template, wherein the visual template comprises information about a visual characteristic of the computer-generated visual data representation;
an interpreter in communication with the memory, interpreting a visual element of the visual template and identifying a text element within the textual description template, the text element corresponding to the visual element;
a generator in communication with the interpreter for generating a textual description element which incorporates data from the data set based on the text element;
an assembler in communication with the generator for assembling one or more text description elements into a textual description, wherein the textual description describes the visual characteristic of the computer-generated visual data representation, and wherein the textual description comprises visual semantic information available within the computer-generated visual data representation.

23. The system of claim 22, wherein the visual element comprises a visual interactive element for allowing a user to interact with the visual data representation and wherein the generated textual description element comprises a textual interactive element for providing substantially the same interactive functionality within the textual description as the visual interactive element.

24. The system of claim 22, further comprising:
an interface component which receives a request to generate a textual description for the visual data representation.

25. The system of claim 24, wherein the request originates from a user and the interface component sends the generated textual description over a network to the user.

26. The system of claim 24, wherein the request is automatically generated.

27. The system of claim 24, wherein the request comprises one of the data set, the visual template, and the textual description template.

28. The system of claim 24, wherein the request comprises one or more parameters which identify a source for at least one of the data set, the visual template, and the textual description template.

29. The system of claim 22, wherein the textual description template supports a plurality of visual templates.

30. The system of claim 22, wherein the memory comprises a language identifier which identifies the language for the textual description and wherein the textual description template comprises text elements associated with the identified language.

31. The system of claim 22, wherein the data set and visual template are integrated within a single data source.

32. A method for dynamically generating a textual description for an interactive web-based chart having a dynamic data source, the method being performed by a computing device, the method comprising:

receiving a request to generate a textual description for the computer-generated web-based chart, a data set, a visual template corresponding to the computer-generated web-based chart, and a textual description template, wherein the visual template comprises information about a visual characteristic of the computer-generated web-based chart;

interpreting a visual element of the visual template;

identifying a text element within the textual description template, the text element corresponding to the visual element;

generating a textual description element which incorporates data from the data set based on the text element;

storing the textual description element in a textual description, wherein the textual description describes the visual characteristic of the computer-generated web-based chart, and wherein the textual description comprises visual semantic information available within the computer-generated web-based chart; and sending the textual description in response to the request.

33. The method of claim 32, further comprising:

modifying at least one of the data set, the visual template, and the textual description template based on a set of parameters.

34. The method of claim 32, wherein the request comprises a language identifier and wherein the textual description template supports the identified language.

35. A system for dynamically generating a textual description for a computer-generated visual data representation, the system comprising:

means for accessing a data set corresponding to the computer-generated visual data representation;

means for accessing a visual template associated with the computer-generated visual data representation, wherein the visual template comprises information about a visual characteristic of the computer-generated visual data representation;

means for accessing a textual description template;

means for interpreting the visual template using the textual description template and data from the data set to generate a textual description which describes the visual characteristic of the computer-generated visual data representation, wherein the textual description comprises visual semantic information available within the computer-generated visual data representation.

* * * * *